(12) United States Patent
Zhou et al.

(10) Patent No.: US 12,554,526 B2
(45) Date of Patent: Feb. 17, 2026

(54) REGISTER CACHING FOR EFFICIENT VIRTUAL MACHINE INTROSPECTION

(71) Applicant: Google LLC, Mountain View, CA (US)

(72) Inventors: Hao Zhou, Dublin, CA (US); Mahesh Pisal, Pleasanton, CA (US); Kenneth L. Hofsass, Seattle, WA (US); Timothy Dylan Peacock, San Francisco, CA (US)

(73) Assignee: Google LLC, Mountain View, CA (US)

( * ) Notice: Subject to any disclaimer, the term of this patent is extended or adjusted under 35 U.S.C. 154(b) by 442 days.

(21) Appl. No.: 18/157,379

(22) Filed: Jan. 20, 2023

(65) Prior Publication Data

US 2023/0236868 A1   Jul. 27, 2023

Related U.S. Application Data

(60) Provisional application No. 63/301,678, filed on Jan. 21, 2022.

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01); *G06F 2009/45587* (2013.01)

(58) Field of Classification Search
CPC ......... G06F 9/45558; G06F 2009/4557; G06F 2009/45583; G06F 2009/45587
See application file for complete search history.

(56) References Cited

U.S. PATENT DOCUMENTS

2014/0053272 A1   2/2014  Lukacs et al.
2019/0044946 A1*  2/2019  Hwang ............... H04L 63/101

OTHER PUBLICATIONS

Zhao et al. Seeing Through The Same Lens: Introspecting Guest Address Space At Native Speed. 26th USENIX Security Symposium, Aug. 18, 2017 (Aug. 18, 2017), pp. 799-813, Retrieved from the Internet: <https://www.usenix.org/system/files/conference/usenixsecurity17/sec17-zhao.pdf>.
International Search Report and Written Opinion for International Application No. PCT/US2023/011236 dated May 8, 2023. 15 pages.

* cited by examiner

*Primary Examiner* — Gregory A Kessler
(74) *Attorney, Agent, or Firm* — Lerner David LLP

(57) ABSTRACT

A virtual machine malware detection service caches contents that correspond to operating system registries. By caching the content of important registers, the malware detector is able to efficiently traverse virtual machine memory contents to identify important operating system properties. Examples of such operating system properties include a list of running processes. The malware detector replaces agent-based threat detection for compute endpoints. The malware detector detects cryptocurrency miners and malware by scanning guest virtual machine (VM) memories. The guest VM memory may be scanned according to the guest physical address. According to some examples, the memories of guest user processes may be scanned one by one, using the page table address for each guest process to efficiently locate its memory.

15 Claims, 5 Drawing Sheets

REGISTER CACHING FOR EFFICIENT VIRTUAL MACHINE INTROSPECTION

CROSS-REFERENCE TO RELATED APPLICATIONS

The present application claims the benefit of the filing date of U.S. Provisional Patent Application No. 63/301,678, filed Jan. 21, 2022, the disclosure of which is hereby incorporated by reference.

BACKGROUND

Virtual machine introspection enables tamper-resistant inspection of virtual machines from the privileged plane of the hypervisor. An operator of a cloud computing platform can offer a differentiated set of security and performance monitoring capabilities by building introspection-based services. Because virtual machine memory can be large, processing this memory to derive insights can be time consuming and resource intensive.

BRIEF SUMMARY

This disclosure describes a virtual machine malware detection service that caches contents that correspond to operating system registries. By caching the content of important registers, the malware detector is able to efficiently traverse virtual machine memory contents to identify important operating system properties. Examples of such operating system properties include a list of running processes.

The malware detector replaces agent-based threat detection for compute endpoints. The malware detector detects cryptocurrency miners and malware by scanning guest virtual machine (VM) memories. The guest VM memory may be scanned according to the guest physical address. According to some examples, the memories of guest user processes may be scanned one by one, using the page table address for each guest process to efficiently locate its memory.

One aspect of the disclosure provides a method for efficient introspection of one or more virtual machines supported by a hypervisor. Such method may include identifying, with one or more processors, address values for one or more particular virtual machine processes; storing the identified address values in a physical memory of the hypervisor; and providing the stored values to computing units for introspection.

In some examples, the address values may include register values, such as CR3 register values. In such examples, the method may further include constructing a unique identifier from the CR3 register values and some contents of the physical memory pointed to by the CR3 values. The contents of the physical memory pointed to by the CR3 values may be a page of the physical memory. The method may further include comparing the unique identifier to a database of identifiers for virtual machine processes that have already been scanned. Further, the method may include determining not to scan a given virtual machine process if the unique identifier matches an identifier in the database to at least M %, where M is less than 100.

According to some examples, storing the identified addresses may include mapping address space in the physical hypervisor memory to individual virtual machines of the one or more virtual machines supported by the hypervisor.

According to some examples, providing the stored values may include providing a pointer to a page address table that points to address mapping for running processes. In some examples, providing the stored values may include providing a virtual machine threat detection analysis engine with access to the stored values.

According to some examples, identifying the addresses for the one or more particular virtual machine processes may include reading a register each time a virtual machine exit is performed.

According to some examples, the method may further include scanning memory for the one or more particular virtual machine processes based on the stored value.

Another aspect of the disclosure provides a system for efficient introspection of one or more virtual machines supported by a hypervisor. The system may include one or more processors in communication with the one or more virtual machines. The one or more processors may be configured to identify address values for one or more particular virtual machine processes, store the identified address values in a physical memory of the hypervisor, and provide the stored values to one or more computing units for introspection.

In some examples, the address values may be CR3 register values. The one or more processors may be further configured to construct a unique identifier from the CR3 register values and contents from a page of the physical memory pointed to by the CR3 values. The one or more processors may be further configured to compare unique identifier to a database of identifiers for virtual machine processes that have already been scanned. The one or more processors may be further configured to determine not to scan a given virtual machine process if the unique identifier matches an identifier in the database to at least M %, where M is less than 100.

According to some examples, the one or more computing units may include a virtual machine threat detection analysis engine.

According to some examples, in identifying the addresses for the one or more particular virtual machine processes, the one or more processors may be further configured to read a register each time a virtual machine exit is performed.

According to some examples, the one or more processors may be further configured to scan memory for the one or more particular virtual machine processes based on the stored value.

DETAILED DESCRIPTION

The present disclosure provides for caching page table root addresses for guest virtual machine (VM) processes. For example, the page table root addresses may be cached in a hypervisor or VM monitor (VMM) in natural VM exit handling logic. In some examples, this can be handled in userland VMM logic. If kernel symbol addresses for guest kernels are known, process objects can be extracted from kernel memory, and a page table address can be found in a memory manager description, e.g., mm_struct, pointed to by the process object.

In x86, the page table root address of a process is stored in CR3. In VM exit, the content of the CR3 register is stored in a virtual machine control structure (VMCS). In some examples, a circular or ring buffer can be used to cache CR3 registers for each guest process during VM exit handling.

Figure 1:
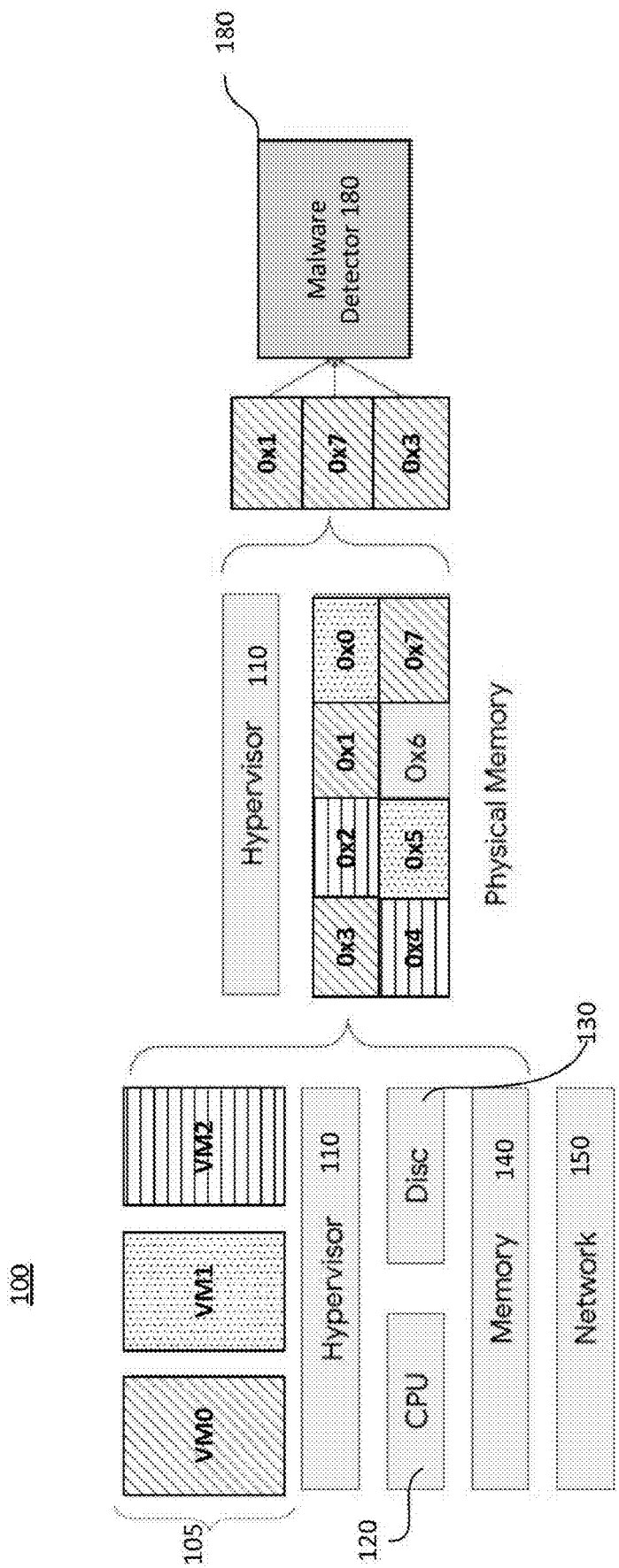
FIG. 1 is a block diagram illustrating an example system according to aspects of the disclosure.

FIG. 1 illustrates an example system. As shown, hypervisor 110 creates and/or runs one or more VMs 105, including VM0, VM1, VM2. Each of the VMs 105 may virtually share resources of the hypervisor 110, such as processing resource, e.g., CPU 120, memory 140, disc 130, etc. The VMs 105 may communicate with each other and/or other computing systems through network 150.

The CPU 120 may be any of a variety of types of CPU, such as an advanced reduced inspection set computer machine (ARM), Intel x86, etc. The CPU 120 may have registers that store information, such as a root address of a process page table. In some examples, the register may be a CR3 register. In other examples, such as examples implementing other types of CPU families, the register may have a different name or be a different type. While CR3 registers are described in the following examples, it should be understood that other types of registers may be used, such as other control registers, extended control registers, general purpose registers, debug registers, test registers, segment registers, pointer registers, etc.

The memory 140 may store particular information for each VM 105. For example, the memory 140 may store CR3 registers for each VM 105. As shown, the memory 140 stores information for VM0 in address space 0x1, 0x3, and 0x7. Additionally, the memory 140 stores information for VM1 in address space 0x0 and 0x5, and information for VM2 in address space 0x2 and 0x4.

In this regard, the information for a particular VM may be quickly identified using the physical memory 140 of the hypervisor 110. For example, as illustrated in FIG. 1, the information for VM0 may be identified using address spaces 0x1, 0x7, and 0x3 of the physical memory 140 of the hypervisor 110. Moreover, such information can be provided to other devices or computing units, such as malware detector analysis engine 180. For example, if a particular portion of VM0 is needed for introspection, such as for a threat detection analysis, an address for that particular portion may be stored in the physical memory 140 of the hypervisor 110 for quick and efficient access, without requiring searching through vast amounts of information in the VM0.

According to some examples, the information for each VM 105 stored in the physical memory 140 may include content of a CR3 register. CR3 is a control register used when virtual addressing is enabled. CR3 enables a processing unit to translate linear addresses into physical addresses by locating the page directory and page tables for the current task.

Figure 2:
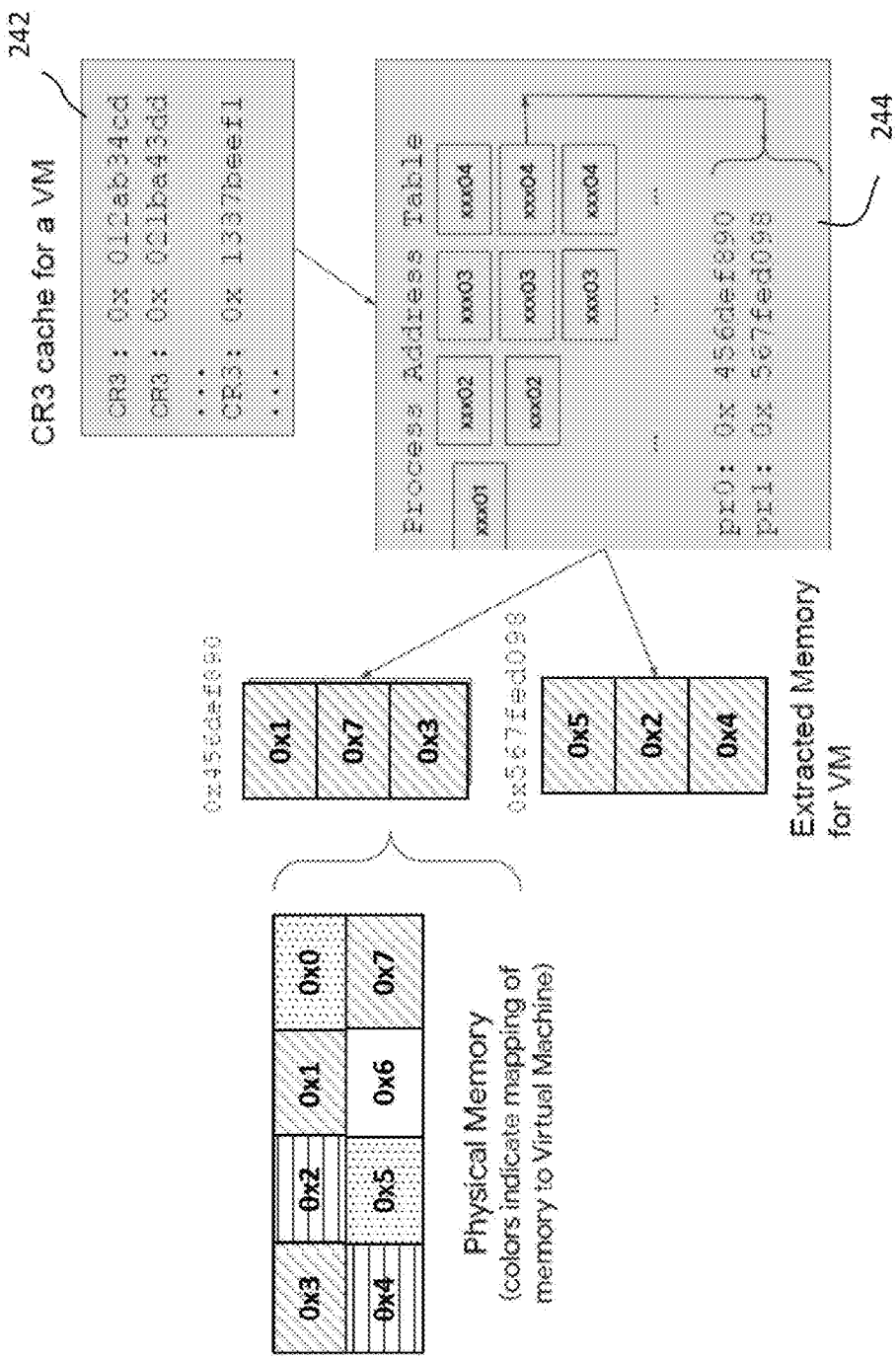
FIG. 2 is a block diagram illustrating an example of CR3 address caching according to aspects of the disclosure.

FIG. 2 illustrates an example of CR3 caching. CR3 cache 242 points to process address table 244. The process address table 244 points to address mappings for running processes. For example, the process address table 244 points to the physical addresses of memory of VM0 that belong to an active process running in VM0. Using CR3 caching in this regard allows for efficiently locating the process address table 244 to enable locating and describing a layout of process memory.

Code and read-only data memory of running processes may be scanned, for example, to detect cryptocurrency miners and malware. Large swaths of VM memory contain read/write data rather than program code. Scanning read/write data in VM memory is inefficient and can lead to false positives when looking for malware. In contrast, detecting and caching the CR3 register allows for efficiently locating the process address table 244 and therefore efficiently locating process memory to be scanned.

By caching the location of important register addresses, the malware detector is able to efficiently traverse virtual machine memory contents to identify important operating system properties. Examples of such operating system properties include a running process queue, open sockets, kernel modules, debugging hooks, etc.

Figure 3:
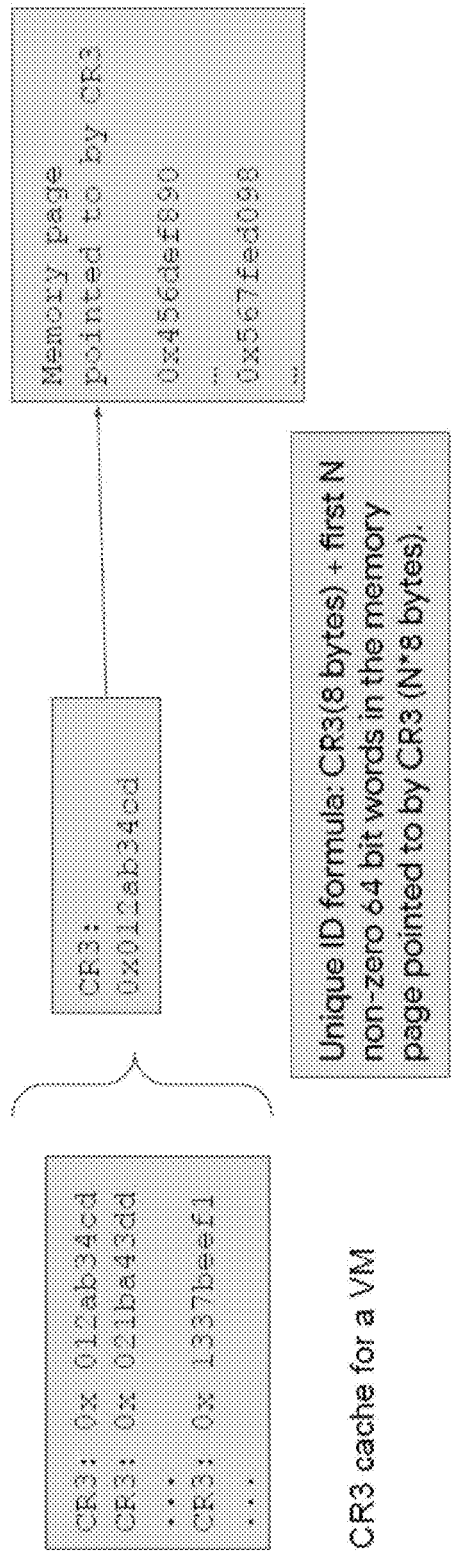
FIG. 3 illustrates an example of uniquely identifying a process in a VM's life span according to aspects of the disclosure.

FIG. 3 illustrates an example of uniquely identifying a process in a VM's life span. Process memory inside a VM may be scanned periodically, e.g. to detect cryptominers. Once a process has been scanned, it does not need to be scanned again. According to some examples, a unique identifier of a process may be used to determine if the process has already been scanned. For example, when processes are scanned, identifiers for such processes may be recorded in a list, table, or any other data structure. In determining whether a given process has been scanned, the unique identifier of the given process may be compared with the recorded identifiers for processes that have already been scanned.

According to some examples, the unique identifier may be generated based on CR3 content. For example, the unique identifier may be generated from cached CR3 content plus a signature on the memory page pointed to by the CR3 register. As an example, the unique identifier may be generated using 8 bytes of the CR3 plus the first N non-zero 64 bit words in the memory page to which the CR3 points. In other examples, the unique signature may be generated using other formats, such as a different number of bits of the CR3 register and/or memory page, or using words from a different portion of the memory page, such as the last N words, etc. By integrating the signature, a risk of identifiers being duplicated can be avoided when the operating system reuses page table root addresses for a new process from a terminated process.

When comparing the unique identifier for the given process to the recorded identifiers, the unique identifier can be matched to a predetermined degree that is less than 100% match and still be considered a match. For example, when unique identifiers are generated using the example formula illustrated in FIG. 3 and described above, such that they are based on 8 bytes of cached CR3 content plus a signature of 64 bit words, the unique identifiers may be considered a match if the 8 bytes of CR3 content match exactly and the N 64 bits match M %, where M is less than 100. According to some examples, M may be as low as approximately 60. In other examples, M may be higher or lower.

Figure 4:
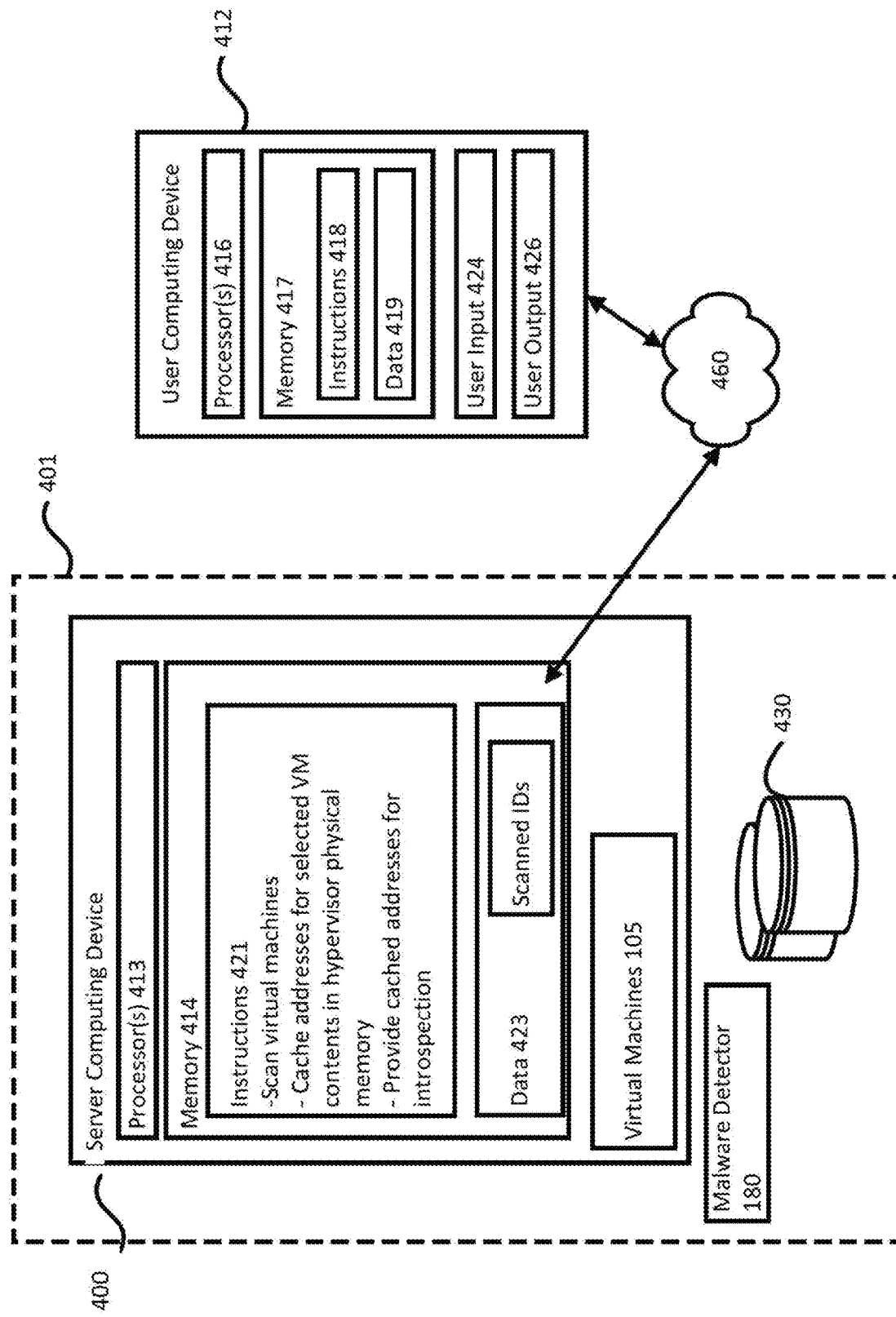
FIG. 4 is a block diagram illustrating an example system according to aspects of the disclosure.

FIG. 4 is a block diagram of an example environment for implementing the system described above. The system can be implemented on one or more devices having one or more processors in one or more locations, such as in server computing device 415.

User computing device 412 and the server computing device 415 can be communicatively coupled to one or more storage devices 430 over a network 460. The storage device(s) 430 can be a combination of volatile and non-volatile memory, and can be at the same or different physical locations than the computing devices 412, 415. For example, the storage device(s) 430 can include any type of non-transitory computer readable medium capable of storing information, such as a hard-drive, solid state drive, tape drive, optical storage, memory card, ROM, RAM, DVD, CD-ROM, write-capable, and read-only memories.

The storage device(s) 430 and the server computing device 415 can be part of the computing platform 401. The computing platform 401 can be configured to perform a number of cloud computing platform services using the devices 415, 430, such as hosting cloud storage for data back-up, or hosting one or more virtual machines accessible by user computing devices in communication with the platform 401.

The server computing device 415 can include one or more processors 413 and memory 414. The memory 414 can store information accessible by the processor(s) 413, including instructions 421 that can be executed by the processor(s) 413. The memory 414 can also include data 423 that can be retrieved, manipulated or stored by the processor(s) 413. The memory 414 can be a type of non-transitory computer readable medium capable of storing information accessible by the processor(s) 413, such as volatile and non-volatile memory. The processor(s) 413 can include one or more central processing units (CPUs), graphic processing units (GPUs), field-programmable gate arrays (FPGAs), and/or application-specific integrated circuits (ASICs), such as tensor processing units (TPUs).

The instructions 421 can include one or more instructions that when executed by the processor(s) 413, cause the one or more processors to perform actions defined by the instructions. The instructions 421 can be stored in object code format for direct processing by the processor(s) 413, or in other formats including interpretable scripts or collections of independent source code modules that are interpreted on demand or compiled in advance. The instructions 421 can include instructions for implementing the system consistent with aspects of this disclosure. The system can be executed using the processor(s) 413, and/or using other processors remotely located from the server computing device 415.

The data 423 can be retrieved, stored, or modified by the processor(s) 413 in accordance with the instructions 421. The data 423 can be stored in computer registers, in a relational or non-relational database as a table having a plurality of different fields and records, or as JSON, YAML, proto, or XML documents. The data 423 can also be formatted in a computer-readable format such as, but not limited to, binary values, ASCII or Unicode. Moreover, the data 423 can include information sufficient to identify relevant information, such as numbers, descriptive text, proprietary codes, pointers, references to data stored in other memories, including other network locations, or information that is used by a function to calculate relevant data.

According to some examples, the data 423 may include a log of identifiers corresponding to scanned processes. In this regard, instructions 421 may be executed to determine whether a process has already been scanned, such as by comparing a unique identifier for the processes to the log of identifiers in the data 423.

Instructions 421 may further be executed to identify particular processes of virtual machines 105. Such processes may be identified to, for example, malware detector 180 for performing threat detection operations, such as protecting against malware programs and cryptocurrency miners. For example, the instructions 421 may provide for scanning VM memory, caching addresses, such as page table addresses, in hypervisor memory, and providing an indication of such addresses for introspection. For example, the instructions may provide for allowing the malware detector 180 to access the cached addresses to identify VM contents for introspection.

The user computing device 412 can also be configured similarly to the server computing device 415, with one or more processors 416, memory 417, instructions 418, and data 419. The user computing device 412 can also include a user output 426, and a user input 424. The user input 424 can include any appropriate mechanism or technique for receiving input from a user, such as keyboard, mouse, mechanical actuators, soft actuators, touchscreens, microphones, and sensors.

Although FIG. 4 illustrates the processors 413, 416 and the memories 414, 417 as being within the computing devices 415, 412, components described in this specification, including the processors 413, 416 and the memories 414, 417 can include multiple processors and memories that can operate in different physical locations and not within the same computing device. For example, some of the instructions 421, 418 and the data 423, 419 can be stored on a removable SD card and others within a read-only computer chip. Some or all of the instructions and data can be stored in a location physically remote from, yet still accessible by, the processors 413, 416. Similarly, the processors 413, 416 can include a collection of processors that can perform concurrent and/or sequential operation. The computing devices 415, 412 can each include one or more internal clocks providing timing information, which can be used for time measurement for operations and programs run by the computing devices 415, 412.

The server computing device 415 can be configured to receive requests to process data from the user computing device 412. For example, the environment 400 can be part of a computing platform configured to provide a variety of services to users, through various user interfaces and/or APIs exposing the platform services. For example, one or more services can be a machine learning framework or a set of tools for managing software applications programmed to offer a particular service.

The devices 412, 415 can be capable of direct and indirect communication over the network 460. The devices 415, 412 can set up listening sockets that may accept an initiating connection for sending and receiving information. The network 460 itself can include various configurations and protocols including the Internet, World Wide Web, intranets, virtual private networks, wide area networks, local networks, and private networks using communication protocols proprietary to one or more companies. The network 460 can support a variety of short- and long-range connections. The short- and long-range connections may be made over different bandwidths, such as 2.402 GHz to 2.480 GHz 2.4 GHz and 5 GHz; or with a variety of communication standards, such as standards for wireless broadband communication. The network 460, additionally or alternatively, can also support wired connections between the devices 412, 415, including over various types of Ethernet connection.

Although a single server computing device 415 and user computing device 412 are shown in FIG. 4, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

According to some examples, implementation of the system described above may be modified. For example, in a first example implementation, malware detector code inside a hypervisor registers a kernel-based virtual machine (KVM) exit interception hook so that each time the hypervisor handles a VM exit, a call is made to read the CR3 register and save the value into memory, such as a ring buffer. For example, the hypervisor may register a kvm_cpu exit interception hook so that malware detector_vm_exit_handler( ) is called each time the hypervisor handles a VM exit (ioctl(KVM_VCPU_RUN) returns to userspace). A malware detector_vm_exit_handler( ) calls KVM input/output control application programming interface (API) (KVM_GET_SREGS) to read the CR3 register, and saves the value into a ring buffer. A least recently used (LRU) scheme with de-duplication functionality can be employed to make sure the most recently intercepted CR3s are in the buffer.

According to a second example, the functionality may be implemented in a hypervisor where the CR3 is passed in VM exit logic. Similar to the first example, the hypervisor may register for kvm_cpu exit interception hook. In this example, however, the hypervisor may change code to use x86 KVM SYNC_REGS functionality (KVM_SYNC_X86_SREGS), so that CR3 and other registers will be brought back from KVM to the hypervisor upon each VM exit.

In a third example implementation, the logic to capture and cache CR3 from VMCS upon each VM exit is built in KVM. API changes may be implemented between KVM and the hypervisor to read and/or configure the CR3 cache.

While several example implementations are described above, it should be understood that additional implementations are possible.

Example Methods

Figure 5:
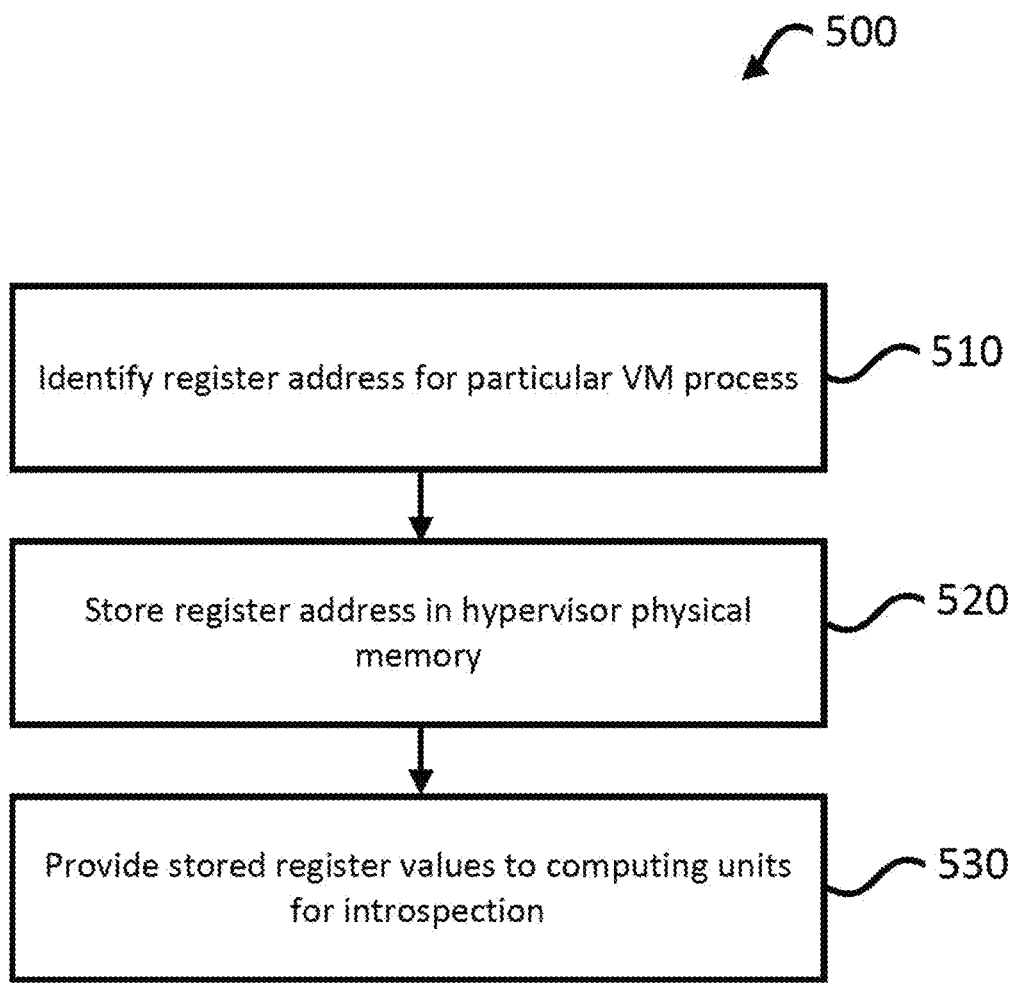
FIG. 5 is a flow diagram illustrating an example method according to aspects of the disclosure.

FIG. 5 is a flow chart of an example process 500 of providing a mechanism for efficient introspection of one or more virtual machines. While FIG. 5 illustrates operations of the process 400 in an example order, it should be understood that the order may be modified or operations may be performed in parallel. Moreover, operations may be added or omitted.

In block 510, register addresses for particular VM processes may be identified. According to some examples, the register address may be identified based on a scan of the VM. For example, the scan may be performed by one or more processors, such as in a virtual machine threat detection unit or other processors in communication with the virtual machines. According to other examples, the particular VM processes and/or the register addresses therefor may be automatically identified using VM exit logic, such as through operation of a hypervisor.

In block 520, the register addresses may be stored in hypervisor physical memory. For example, the address of host machine physical memory may be mapped to different VMs supported by the hypervisor. Each process' virtual address space may include information used to identify the particular VM processes and their location. According to some examples, the stored register addresses are CR3 addresses for processes running in the VMs.

In block 530, the stored register values may be provided to one or more computing units for efficient introspection of the VMs. For example, the address in a CR3 register for a process in a VM that is stored in hypervisor memory may be accessed by a malware detector computing unit. The CR3 address points to a process address table, which points to address mappings for a running process. In this regard, the malware detector can efficiently locate the address for running processes, without scanning entire memory contents.

Aspects of the disclosure provide for efficiently and reliably locating a memory section that contains all information needed to identify other parts of memory to be inspected.

Aspects of this disclosure can be implemented in digital circuits, computer-readable storage media, as one or more computer programs, or a combination of one or more of the foregoing. The computer-readable storage media can be non-transitory, for example, as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for efficient introspection of one or more virtual machines supported by a hypervisor, the method comprising:
   identifying, with one or more processors, address values for one or more particular virtual machine processes, wherein the address values comprise control register 3 (CR3) register values;
   constructing a unique identifier from the CR3 register values and contents of physical memory pointed to by the CR3 register values;

storing the identified address values in a physical hypervisor memory of the hypervisor; and providing the stored values to computing units external to the hypervisor for introspection.

2. The method of claim 1, wherein the contents of the physical memory pointed to by the CR3 register values comprise at least a page of the physical memory.

3. The method of claim 1, further comprising comparing the unique identifier to a database of identifiers for virtual machine processes that have already been scanned.

4. The method of claim 3, further comprising determining not to scan a given virtual machine process if the unique identifier matches an identifier in the database to at least M %, where M is less than 100.

5. The method of claim 1, wherein storing the identified address values comprises mapping address space in the physical hypervisor memory to individual virtual machines of the one or more virtual machines supported by the hypervisor.

6. The method of claim 1, wherein providing the stored values comprises providing a pointer to a page address table that points to address mapping for running processes.

7. The method of claim 1, wherein providing the stored values comprises providing a virtual machine threat detection analysis engine with access to the stored values.

8. The method of claim 1, wherein identifying the addresses for the one or more particular virtual machine processes comprises reading a register each time a virtual machine exit is performed.

9. The method of claim 1, further comprising scanning memory for the one or more particular virtual machine processes based on the stored values.

10. A system for efficient introspection of one or more virtual machines supported by a hypervisor, comprising:

one or more processors in communication with the one or more virtual machines, the one or more processors configured to:

identify address values for one or more particular virtual machine processes, wherein the address values comprise control register 3 (CR3) register values;

construct a unique identifier from the CR3 register values and contents from a page of physical memory pointed to by the CR3 values;

store the identified address values in a physical hypervisor memory of the hypervisor; and provide the stored address values to one or more computing units external to the hypervisor for introspection.

11. The system of claim 10, wherein the one or more processors are further configured to compare the unique identifier to a database of identifiers for virtual machine processes that have already been scanned.

12. The system of claim 11, wherein the one or more processors are further configured to determine not to scan a given virtual machine process if the unique identifier matches an identifier in the database to at least M %, where M is less than 100.

13. The system of claim 10, wherein the one or more computing units comprise a virtual machine threat detection analysis engine.

14. The system of claim 10, wherein in identifying the address values for the one or more particular virtual machine processes, the one or more processors are further configured to read a register each time a virtual machine exit is performed.

15. The system of claim 10, wherein the one or more processors are further configured to scan memory for the one or more particular virtual machine processes based on the stored address values.

* * * * *